United States Patent
Kaustubh M V et al.

(10) Patent No.: US 12,492,805 B1
(45) Date of Patent: Dec. 9, 2025

(54) SECURING A LIGHT ASSEMBLY OF AN AIRFIELD LIGHT

(71) Applicant: Honeywell International Inc., Charlotte, NC (US)

(72) Inventors: Keshav Kaustubh M V, Bengaluru (IN); Vivek Ashok Joshi, Bengaluru (IN); Raghuveer Hanumanthrao Desai, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/739,550

(22) Filed: Jun. 11, 2024

(51) Int. Cl.
| | |
|---|---|
| F21V 17/12 | (2006.01) |
| B64F 1/20 | (2006.01) |
| F21S 8/00 | (2006.01) |
| F21V 21/02 | (2006.01) |
| F21W 111/06 | (2006.01) |

(52) U.S. Cl.
CPC ........... *F21V 17/12* (2013.01); *B64F 1/20* (2013.01); *F21S 8/032* (2013.01); *F21V 21/02* (2013.01); *F21W 2111/06* (2013.01)

(58) Field of Classification Search
CPC ........ B64F 1/20; B64D 2203/00; F21S 8/032; F21W 2111/06; F21V 17/18
See application file for complete search history.

(56) References Cited

U.S. PATENT DOCUMENTS

| | | | | |
|---|---|---|---|---|
| 3,703,855 A | * | 11/1972 | Converso | B64F 1/20 404/11 |
| 8,240,887 B2 | | 8/2012 | Daily et al. | |
| 2016/0281965 A1 | * | 9/2016 | Schneider | B64F 1/20 |
| 2018/0162554 A1 | * | 6/2018 | Marquez | B64F 1/205 |

FOREIGN PATENT DOCUMENTS

| | | |
|---|---|---|
| EP | 3333435 A1 | 6/2018 |
| KR | 20000016291 | 8/2000 |
| KR | 200448863 | 5/2010 |
| KR | 20160125672 | 11/2016 |

* cited by examiner

*Primary Examiner* — Alexander K Garlen
(74) *Attorney, Agent, or Firm* — Brooks, Cameron & Huebsch, PLLC

(57) ABSTRACT

Devices, methods, and systems for securing a light assembly of an airfield light are described herein. One device includes a light assembly, a base, and a locking assembly configured to secure the light assembly to the base. The locking assembly includes a plunging mechanism configured to compress against a cover of the light assembly while the cover is being rotated relative to the base, and extend into an opening of the cover of the light assembly to secure the light assembly to the base.

18 Claims, 7 Drawing Sheets

SECURING A LIGHT ASSEMBLY OF AN AIRFIELD LIGHT

TECHNICAL FIELD

The present disclosure relates generally to devices, methods, and systems for securing a light assembly of an airfield light.

BACKGROUND

Airfield infrastructure can include terminals, hangars, maintenance facilities, etc. Airfields can further include runways, approach ways, taxiways, and/or intersections therebetween to direct aircraft traffic and/or other vehicles in and/or around the airfield.

Airfields can include lighting systems to provide visual cues and/or signals for aircraft traffic and/or other vehicles at the airfield. For example, airfield lighting systems can include airfield lights, such as taxiway lights, to direct aircraft and/or other vehicles in and/or around the taxiways and/or intersections therebetween. The taxiway lights may, in some instances, have requirements mandated by regulatory bodies such as the International Civil Aviation Organization (ICAO) and/or Federal Aviation Administration (FAA), among others.

Airfield lights (e.g., taxiway lights) can provide a safe and efficient way to regulate aircraft traffic at an airfield. For example, airfield lights may assist aircraft pilots in taxiing their aircraft between the runway and apron stands of the airfield, and during landing and takeoff of the aircraft. Airfield lights may be used in all weather conditions, as well as at night, to enhance the visibility of the runway and/or taxiway during low-visibility conditions.

DETAILED DESCRIPTION

Figure 1A:
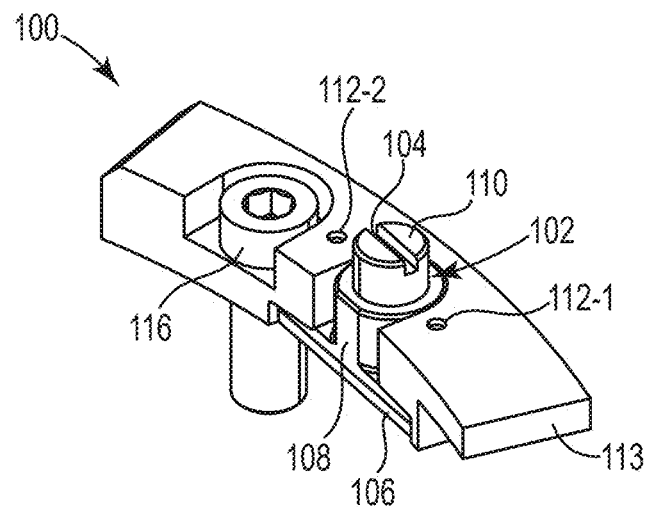
FIGS. 1A and 1B illustrate perspective views of a locking assembly of an airfield light in accordance with an embodiment of the present disclosure.

Devices, methods, and systems for securing a light assembly of an airfield light are described herein. For example, one airfield light includes a light assembly, a base, and a locking assembly configured to secure the light assembly to the base. The locking assembly includes a plunging mechanism configured to compress against a cover of the light assembly while the cover is being rotated relative to the base, and extend into an opening of the cover of the light assembly to secure the light assembly to the base.

Existing airfield lights (e.g., existing airfield taxiway lights) may use fasteners, such as, for instance, bolts (e.g., hex-head bolts) to secure the light assembly of the light to the base of the light. However, due to aircraft tire loads, vibrations, and other loads caused by aircraft passing by airfield lights while taxiing, landing, and/or taking off, such fasteners may come loose and pose a threat (e.g., a foreign object damage threat) to the aircraft traffic and/or other vehicles at the airfield. To prevent such damage, airfield runways and/or taxiways may need to be periodically closed to allow for repair (e.g., re-torquing) and/or replacement of the fasteners. However, closing the runways and/or taxiways for such fastener repair and/or replacement can cause time delays and/or increased costs for the airfield.

Embodiments of the present disclosure, however, can secure the light assembly of an airfield light to the base of the light without using fasteners (e.g., without using bolts). For example, embodiments of the present disclosure can instead use a mechanical locking assembly having a spring or other plunging mechanism to secure the light assembly of the airfield light to the base of the light. Accordingly, embodiments of the present disclosure can allow the airfield to avoid the delays and/or costs associated with having to repair and/or replace fasteners that have come loose.

Further, embodiments (e.g., the locking assembly) of the present disclosure can be utilized in conjunction with the designs and components of existing (e.g., previously installed) airfield lights. As such, the locking assembly of the present disclosure can easily be retrofitted in existing airfield lights, as well as being included in newly manufactured airfield lights. Further, the locking assembly of the present disclosure can be cheap and/or easy to manufacture.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIGS. 1A and 1B, and a similar element may be referenced as 202 in FIG. 2.

As used herein, "a", "an", or "a number of" something can refer to one or more such things, while "a plurality of" something can refer to more than one such things. For example, "a number of locking assemblies" can refer to one or more locking assemblies, while "a plurality of locking assemblies" can refer to more than one locking assembly.

Figure 1B:
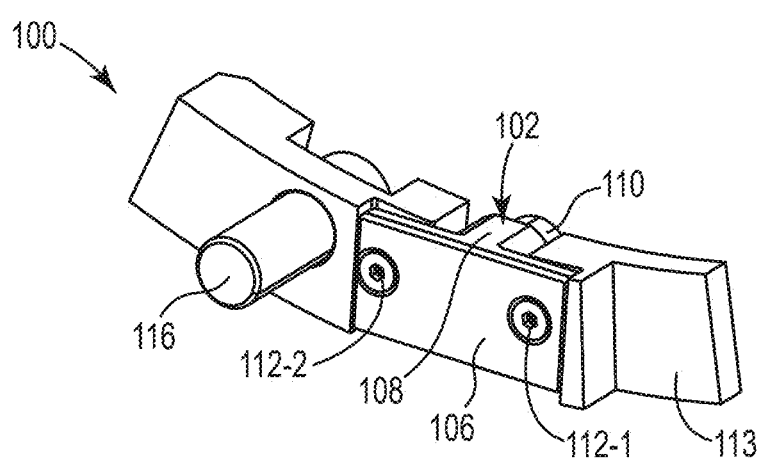

FIGS. 1A and 1B illustrate perspective views of a locking assembly 100 of an airfield light in accordance with an embodiment of the present disclosure. Locking assembly 100 can be, for instance, a locker arm assembly, and can be used to secure (e.g., lock) a light assembly of the airfield light to a base of the airfield light, as will be described herein. Locking assembly 100 can be coupled to the base of the airfield light by bolt 116 illustrated in FIGS. 1A-1B.

As shown in FIGS. 1A and 1B, locking assembly 100 can include a plunging mechanism 102. Plunging mechanism 102 can be used to secure the light assembly of the airfield light to the base of the airfield light. For example, plunging mechanism 102 can compress (e.g., retract) from the extended position illustrated in FIGS. 1A and 1B into a compressed position against a cover of the light assembly (e.g., due to the weight of the cover) while the light assembly is being inserted into the base, and the cover is being rotated (e.g., twisted) relative to, the base, and extend from the compressed position into the extended position in an opening (e.g., locking hole) of the cover upon the cover being rotated such that (e.g., to a position in which) the opening of the cover is over plunging mechanism 102 to secure the light assembly to the base. For instance, rotation of the cover can be prevented from occurring while plunging mechanism 102 is in the extended position in the opening of the cover. An example illustrating the extended and compressed positions will be further described herein (e.g., in connection with FIGS. 4A-4B), and an example illustrating the base and cover will be further described herein (e.g., in connection with FIGS. 6 and 8, respectively).

Plunging mechanism 102 can also be used to remove (e.g., dissemble) the light assembly of the airfield light from the base of the airfield light. For example, as shown in FIG. 1A, plunging mechanism 102 can include a slot 104. Slot 104 can receive a force to compress (e.g., retract) plunging mechanism 102 into the compressed position while the plunging mechanism is extended into (e.g., in) the opening of the cover of the light assembly. For instance, the force can be applied to slot 104 by inserting a screwdriver or other tool into slot 104 through the opening (e.g., locking hole) of the cover and using the screwdriver or other tool to push down against plunging mechanism 102. While the force is being applied to slot 104, the cover can be rotated in the opposite direction relative to the base from which the cover was rotated when securing the light assembly to remove the light assembly from the base, and plunging mechanism 102 remains in the compressed position against the cover while the cover is being rotated.

In some embodiments, plunging mechanism 102 can be a spring plunger that includes a spring. An example of such a plunging mechanism will be further described herein (e.g., in connection with FIG. 3). However, embodiments of the present disclosure are not so limited. For example, in some embodiments, plunging mechanism can be and/or include a solenoid, a mechanical actuator, or a pneumatic plunger.

As shown in FIGS. 1A-1B, plunging mechanism 102 includes a plate (e.g., bottom cover plate) 106, a housing (e.g., body) 108 coupled to plate 106, and a pin 110. Pin 110 can vertically compress relative to (e.g., into) housing 108 when contacted against the cover of the light assembly (e.g., due to the weight of the cover), and can vertically extend relative to (e.g., outward from) housing 108 into the opening of the cover of the light assembly. An example illustrating the extended and compressed positions of pin 110 will be further described herein (e.g., in connection with FIGS. 4A-4B). Housing 108 can be coupled to plate 106 by screws 112-1 and 112-2, which can also couple plunging mechanism 102 to other portions of locking assembly 100, as illustrated in FIGS. 1A-1B.

Plunging mechanism 102 can comprise a steel material. For example, plate 106, housing 108, pin 110, and screws 112-1 and 112-2 can each be stainless steel. An example further illustrating the components of plunging mechanism 102 will be further described herein (e.g., in connection with FIGS. 2-3).

As shown in FIGS. 1A-1B, locking assembly 100 can include a portion (e.g., rectangular arm) 113. Portion 113 can extend into a slot (e.g., a locking radial slot) of the cover of the light assembly while plunging mechanism 102 (e.g., pin 110) is extended into the opening of the cover to secure the light assembly to the base of the airfield light. For instance, portion 113 can prevent the cover from being lifted while portion 113 is extended into the slot of the cover.

Figure 2:
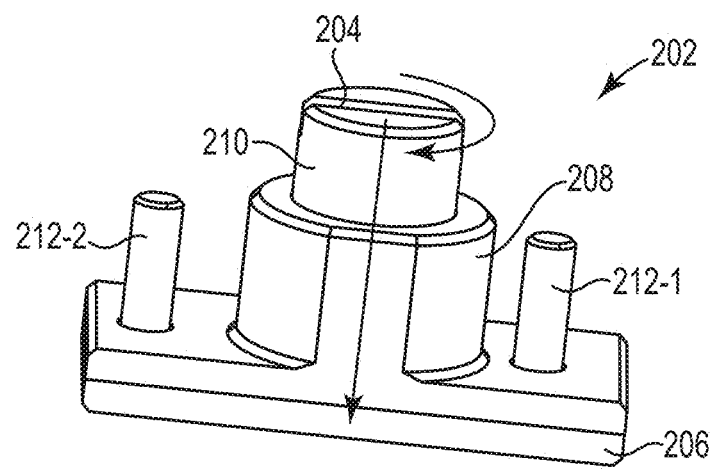
FIG. 2 illustrates a perspective view of a plunging mechanism of an airfield light in accordance with an embodiment of the present disclosure.
Figure 3:
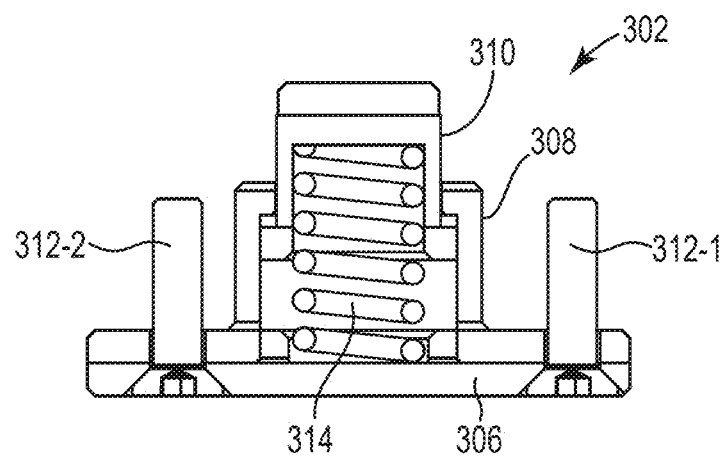
FIG. 3 illustrates a cross-sectional view of a plunging mechanism of an airfield light in accordance with an embodiment of the present disclosure.

FIG. 2 illustrates a perspective view of a plunging mechanism 202 of an airfield light in accordance with an embodiment of the present disclosure. FIG. 3 illustrates a cross-sectional view of a plunging mechanism 302 of an airfield light in accordance with an embodiment of the present disclosure. Plunging mechanisms 202 and/or 302 can be, for instance, plunging mechanism 102 previously described in connection with FIGS. 1A and 1B.

As shown in FIGS. 2 and 3, plunging mechanisms 202, 302 can include a plate (e.g., bottom cover plate) 206, 306, a housing (e.g., body) 208, 308 coupled to plate 206, 306, respectively, and a pin 210, 310. Plates 206 and/or 306, housings 208 and/or 308, and pins 210 and/or 310 can be, for instance, plate 106, housing 108, and pin 110, respectively, previously described in connection with FIGS. 1A and 1B. Housing 208 can be coupled to plate 206 by screws 212-1 and 212 (e.g., screws 112-1 and 112-2 previously described in connection with FIG. 1) as illustrated in FIG. 2, and housing 308 can be coupled to plate 306 by screws 312-1 and 312-2 (e.g., screws 112-1 and 112-2 previously described in connection with FIG. 1) as illustrated in FIG. 3. Plates 206, 306, housings 208, 308, pins 210, 310, screws 212-1, 312-1, and screws 212-2, 312-2 can each comprise stainless steel.

As shown in FIG. 3, plunging mechanism 302 can include a spring 314 inside of housing 308 and in contact with pin 310. That is, plunging mechanism 302 can be a spring plunger. Spring 314 can be, for example, a steel spring. Further, plunging mechanism 202 can be a spring plunger that includes a spring analogous to spring 314 inside of housing 208 and in contact with pin 210. However, embodiments of the present disclosure are not so limited, as previously described herein.

Pins 210, 310 can vertically compress relative to (e.g., into) housings 208, 308, respectively, as represented by the vertical arrow illustrated in FIG. 2. For instance, when a downward force is applied to pins 210, 310, such as, for example, when a cover of a light assembly contacts (e.g., is pushed against) pins 210, 310 (e.g., while securing the light assembly to the base of the airfield light), as previously described herein, the spring (e.g., spring 314) can compress, thereby allowing pins 210, 310 to vertically compress into the housing. Further, spring 314 can subsequently extend, thereby causing pins 210, 310 to vertically extend relative to (e.g., outward from) housing 208, 308, respectively, into an opening of the cover of the light assembly (e.g., to secure the light assembly to the base), as previously described herein. Pins 210, 310, can also rotate about the vertical axis of plunging mechanisms 202, 302, respectively, as represented by the circular arrow illustrated in FIG. 2. For instance, pins 210, 310 can rotate while vertically compressing and/or vertically extending (e.g., while moving up or down).

As shown in FIG. 2, pin 210 of plunging mechanism 202 can include a slot 204. Slot 204 can be, for instance, slot 104 previously described in connection with FIG. 1A. Further, pin 310 of plunging mechanism 302 can include a slot analogous to slot 104 and/or 204.

Slot 204 can receive a force that can cause pins 210, 310, to vertically compress into housing 208, 308, respectively. For instance, when a force is applied to slot 204, spring 314 can compress, thereby allowing pins 210, 310 to compress, as previously described herein. The force can be applied to slot 204 by, for example, inserting a screwdriver or other tool into slot 204 and using the screwdriver or other tool to push down against pin 210, 310, as previously described herein. For instance, the force can be applied to slot 204 to remove (e.g., twist off) the light assembly from the base, as previously described herein.

Figure 4A:
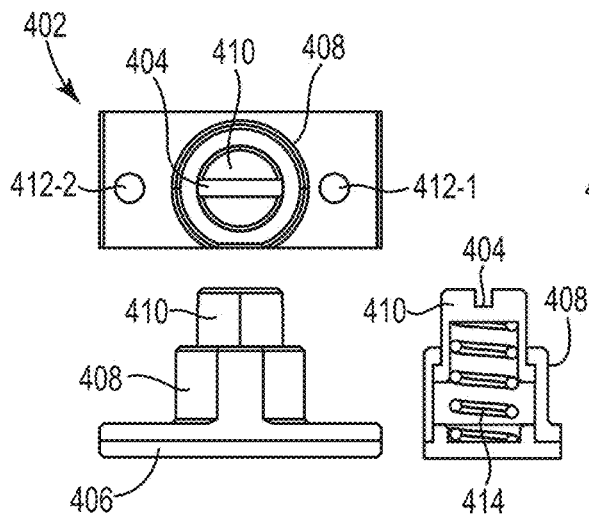
FIG. 4A illustrates a top view, a side view, and a cross-sectional view of a plunging mechanism of an airfield light in an extended position in accordance with an embodiment of the present disclosure.
Figure 4B:
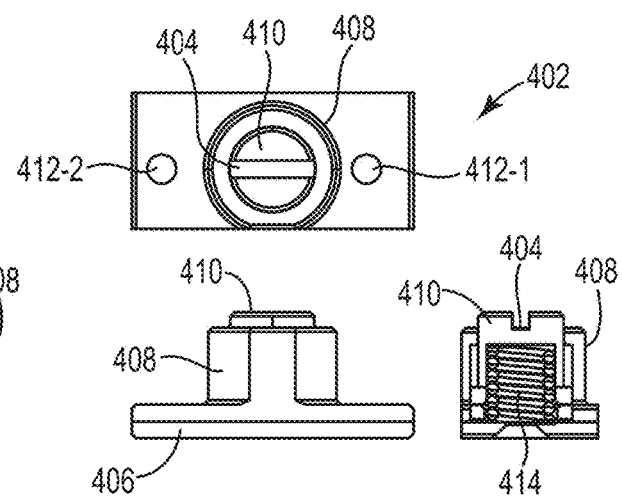
FIG. 4B illustrates a top view, a side view, and a cross-sectional view of a plunging mechanism of an airfield light in a compressed position in accordance with an embodiment of the present disclosure.

FIG. 4A illustrates a top view, a side view, and a cross-sectional view of a plunging mechanism 402 of an airfield light in an extended position in accordance with an embodiment of the present disclosure. FIG. 4B illustrates a top view, a side view, and a cross-sectional view of a plunging mechanism 402 of an airfield light in a compressed position in accordance with an embodiment of the present disclosure. Plunging mechanism 402 can be, for instance, plunging mechanisms 102, 202, and/or 302 previously described in connection with FIGS. 1A-1B, 2, and 3, respectively. For example, plunging mechanism 402 can include a plate 406, a housing 408 coupled to plate 406 by screws 412-1 and 412-2, a pin 410 having a slot 404, and a spring 414 inside of housing 408 and in contact with pin 410, as previously described herein.

In the example illustrated in FIG. 4A, spring 414 is in an extended position (e.g., because no force is being applied downward on pin 410), which causes pin 410 to be vertically extended relative to (e.g., outward from) housing 408, as illustrated in FIG. 4A. The vertically extended pin 410 can extend into an opening of a cover of a light assembly, as previously described herein.

In the example illustrated in FIG. 4B, a force (not shown in FIG. 4B for simplicity and so as not to obscure embodiments of the present disclosure) is being applied downward on pin 410 and/or slot 404 (e.g., by the cover of a light assembly being pushed down against pin 410 and/or by a screwdriver or other tool being inserted into slot 404, as previously described herein). The downward force causes spring 414 to compress, thereby allowing pin 410 to vertically compress into the housing, as illustrated in FIG. 4B.

Figure 5:
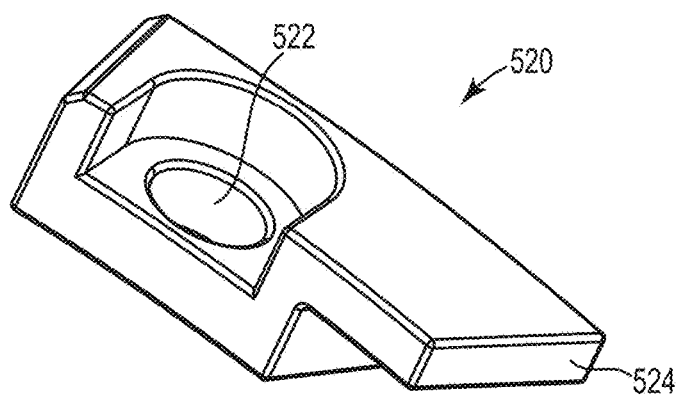
FIG. 5 illustrates a perspective view of a retainer mechanism of an airfield light in accordance with an embodiment of the present disclosure.

FIG. 5 illustrates a perspective view of a retainer mechanism 520 of an airfield light in accordance with an embodiment of the present disclosure. Retainer mechanism 520 can be, for instance, a retainer arm, and can be used to secure (e.g., lock) a light assembly of the airfield light to a base of the airfield light, as will be described herein. Retainer mechanism 520 can include an opening 522 for a bolt (not shown in FIG. 5) to couple retainer mechanism 520 to the base of the airfield light. Retainer mechanism 520 can be smaller than locking assembly 100 previously described in connection with FIGS. 1A and 1B (e.g., because retainer mechanism 520 does not include a plunging mechanism).

As shown in FIG. 5, retainer mechanism 520 can include a portion (e.g., rectangular arm) 524. Portion 524 can extend into a slot (e.g., a locking radial slot) of the cover of the light assembly to secure the light assembly to the base of the airfield light. For instance, portion 524 can extend into the slot upon the cover being rotated to the position previously described herein in which an opening of the cover is over the plunging mechanism of the locking assembly of the airfield light and the plunging mechanism extends into the opening.

Retainer mechanism 520 can provide additional support (e.g., in addition to that provided by locking assembly 100) in preventing (e.g., arresting) motion of the light assembly while the light assembly is secured to the base. For instance, portion 524 can prevent the cover from being lifted while extended into the slot of the cover.

Figure 6:
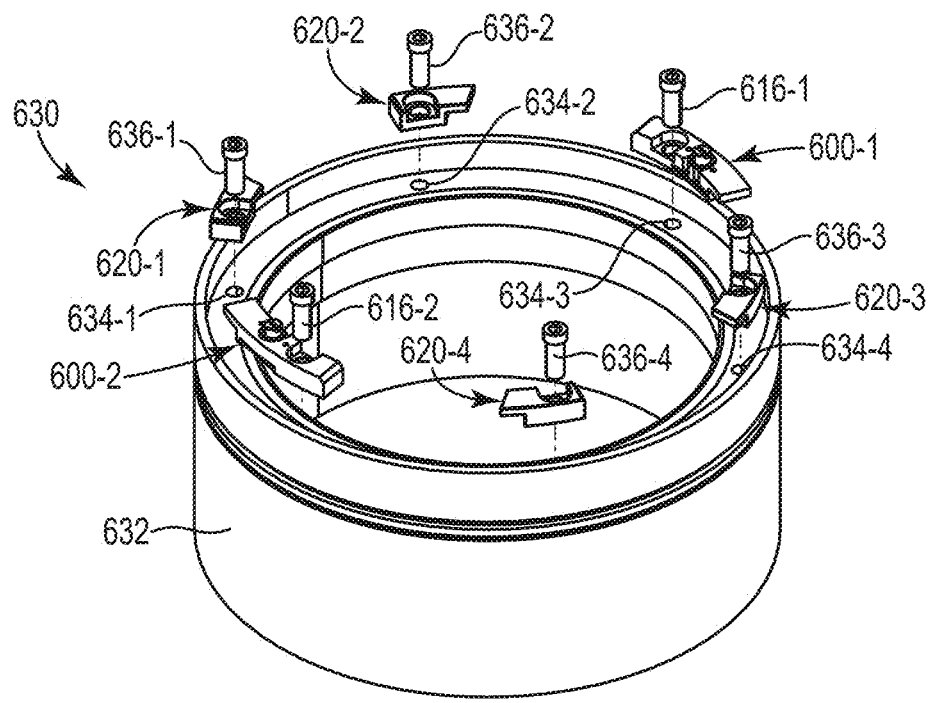
FIG. 6 illustrates an exploded perspective view of a number of locking assemblies and retainer mechanisms of an airfield light in accordance with an embodiment of the present disclosure.

FIG. 6 illustrates an exploded perspective view of a number of locking assemblies and retainer mechanisms of an airfield light 630 in accordance with an embodiment of the present disclosure, along with a base (e.g., base 632) of airfield light 630. Base 632 can be, for instance, a circular base can into which a light assembly of the airfield light can be inserted, as will be further described herein.

As shown in FIG. 6, base 632 can include openings (e.g., holes) 634-1, 634-2, 634-3, and 634-4. Further, base 632 can include two additional openings not visible in FIG. 6 due to the positioning of the perspective view of base 632 illustrated in FIG. 6, such that base 632 includes six openings spaced evenly around base 632 (e.g. each respective opening is located directly across from another one of the openings). In some embodiments, airfield light 630 may be an existing (e.g., previously installed) airfield light that was manufactured with the openings. For instance, the openings can be pre-existing openings that can be utilized in retrofitting the existing airfield light with the locking assembly of the present disclosure.

As shown in FIG. 6, airfield light 630 can include two locking assemblies 600-1 and 600-2 located directly across from one another. Locking assemblies 600-1 and 600-2 can be coupled to base 632 by bolts 616-1 and 616-2, respectively, through two openings of base 632 that are directly across from each other. For instance, in the example illustrated in FIG. 6, bolt 616-1 couples locking assembly 600-1 to base 632 through (e.g., via) opening 634-3, and bolt 616-2 couples locking assembly 600-2 to base 632 through (e.g. via) the opening directly across from opening 634-3.

Locking assemblies 600-1 and 600-2 can be analogous to locking assembly 100 previously described in connection with FIG. 1. For example, each locking assembly 600-1 and 600-2 can include a rectangular arm, and a plunging mechanism that includes a plate, a housing coupled to plate, and a pin with a slot (not labelled with reference numbers in FIG. 6 for clarity and so as not to obscure embodiments of the present disclosure), as previously described herein. Locking assemblies 600-1 and 600-2 can be used to secure a light assembly of airfield light 630 to base 632, as previously described herein. For instance, two locking assemblies (e.g., 600-1 and 600-2) can be utilized with two openings of a cover of the light assembly, as will be further described herein (e.g., in connection with FIG. 8).

As shown in FIG. 6, airfield light 630 can include four retainer mechanisms 620-1, 620-2, 620-3, and 620-4, with each respective retainer mechanism located directly across from another one (e.g., retainer mechanism 620-1 is located directly across from retainer mechanism 620-3, and retainer mechanism 620-2 is located directly across from retainer mechanism 620-4). Retainer mechanisms 620-1, 620-2, 620-3, and 620-4 can be coupled to base 632 by bolts 636-1, 636-2, 636-3, and 636-4, respectively, through the remaining openings of base 632. For instance, in the example illustrated in FIG. 6, bolt 636-1 couples retainer mechanism 620-1 to base 632 through opening 634-1, bolt 636-2 couples retainer mechanism 620-2 to base 632 through opening 634-2, bolt 636-3 couples retainer mechanism 620-3 to base 632 through opening 634-4, and bolt 636-4 couples retainer mechanism 620-4 to base 632 through the remaining opening not visible in FIG. 6. Bolts 636-1, 636-2, 636-3, and 636-4 can be the same type (e.g., part number) of bolt as bolts 616-1 and 616-2 (e.g., six bolts of the same type can be used to couple the retainer mechanisms and locking assemblies to base 632).

Retainer mechanisms 620-1, 620-2, 620-3, and 620-4 can be analogous to retainer mechanism 520 previously described in connection with FIG. 5. For example, each retainer mechanism 620-1, 620-2, 620-3, and 620-4 can include a rectangular arm (not labelled with a reference number in FIG. 6 for clarity and so as not to obscure embodiments of the present disclosure), as previously described herein. Retainer mechanisms 620-1, 620-2, 620-3, and 620-4 can be used to secure the light assembly of airfield light 630 to base 632, as previously described herein. For instance, four locking retainer mechanisms (e.g., 620-1, 620-2, 620-3, and 620-4) can be utilized with four slots of the cover of the light assembly, as will be further described herein (e.g., in connection with FIG. 8).

Figure 7:
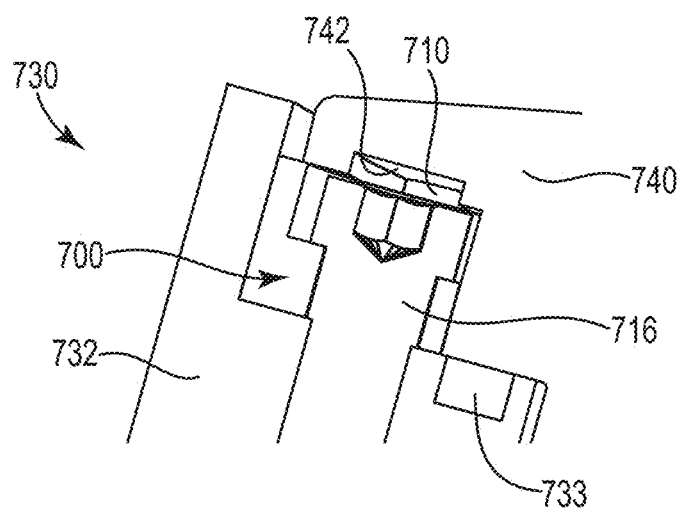
FIG. 7 illustrates a cross-sectional view of a portion of an airfield light in accordance with an embodiment of the present disclosure.

FIG. 7 illustrates a cross-sectional view of a portion of an airfield light 730 in accordance with an embodiment of the present disclosure. In the example illustrated in FIG. 7, a light assembly of airfield light 730 is in the process of being inserted into base 732 to secure the light assembly to base 732, which can be, for instance, base 632 previously described in connection with FIG. 6. For example, a cover 740 of the light assembly is in the process of being rotated relative to base 732 in the example illustrated in FIG. 7.

As shown in FIG. 7, a pin 710 of a locking assembly 700 (e.g., locking assembly 100 previously described in connection with FIGS. 1A-1B and/or locking assemblies 600-1 and 600-2 previously described in connection with FIG. 6) of airfield light 730 is compressed (e.g., retracted) into a compressed position against cover 740 of the light assembly while the light assembly is being inserted into the base 732. For instance, pin 710 can be compressed against a slot (e.g., locating slot) 742 of cover 740 while in contact with the slot. Pin 710 can be, for instance, pin 110, 210, 310, and/or 410 previously described in connection with FIGS. 1A-1B, 2, 3, and 4A-4B, respectively. Bolt 716 (e.g., bolt 116 previously described in connection with FIGS. 1A-1B and/or bolts 616-1 and 616-2 previously described in connection with FIG. 6) can couple locking assembly 700 to base 732, as illustrated in FIG. 7. Further, base 732 can include a gasket 733 that is in contact with a portion of cover 740.

Figure 8:
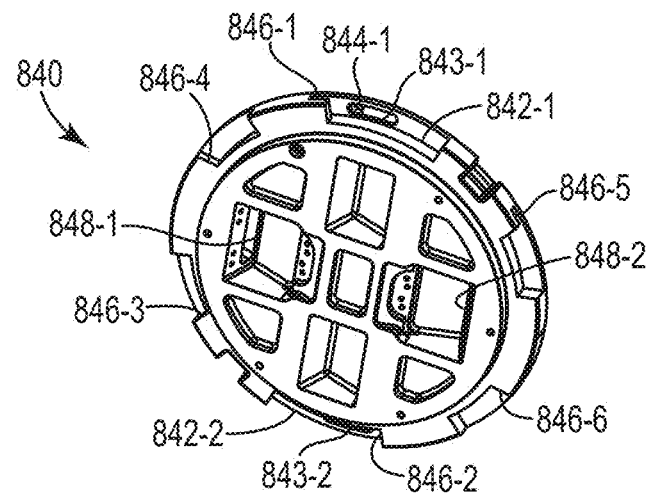
FIG. 8 illustrates a perspective view of a cover of a light assembly of an airfield light in accordance with an embodiment of the present disclosure.

FIG. 8 illustrates a perspective view of a cover 840 of a light assembly of an airfield light in accordance with an embodiment of the present disclosure. Cover 840 can be, for instance, cover 740 previously described in connection with FIG. 7.

As shown in FIG. 8, cover 840 can include slots (e.g., locker arm assembly slots) 842-1 and 842-2 located directly across from one another. Slots 842-1 and 842-2 can receive locking assemblies of the light assembly when the light assembly is being secured to a base of the airfield light, as will be further described herein. Slot 842-1 can include a radial slot 843-1 and slot 842-2 can include a radial slot 843-2, as illustrated in FIG. 8. Radial slots 843-1 and 843-2 can guide pins of the locking assemblies when cover 840 is being rotated to secure the light assembly to (or to unsecure the light assembly from) the base, as will be further described herein. Further, cover 840 can include an opening (e.g., locking hole) at an end of each radial slot 843-1 and 843-2. For instance, opening 844-1 of cover 840 can be located at an end of radial slot 843-1, as illustrated in FIG. 8, and another opening (not visible in FIG. 8 due to the positioning of the perspective view of cover 840 illustrated in FIG. 8) of cover 840 can be located at an end of radial slot 843-2.

As previously described herein, cover 840 can be rotated relative to a base of the airfield light (e.g., base 632 and/or 732 previously described in connection with FIGS. 6 and 7, respectively) while securing the light assembly of the airfield light to the base. For example, the light assembly can be inserted into the base with a first locking assembly (e.g., locking assembly 600-1 previously described in connection with FIG. 6) in slot 842-1 such that a pin of the first locking assembly is compressed (e.g., retracted) against radial slot 843-1 and with a second locking assembly (e.g., locking assembly 600-2 previously described in connection with FIG. 6) in slot 842-2 such that a pin of the second locking assembly is compressed against radial slot 843-2. As such, radial slots 843-1 and 843-2 can be used to guide the locking assembly pins and accordingly guide the orientation of cover 840 (e.g., make sure cover 840 is correctly oriented) relative to the base when inserting the light assembly into the base (or removing the light assembly from the base). For instance, in some embodiments, the light assembly may only be inserted into the base in one (e.g., a single) orientation.

Cover 840 can then be rotated relative to the base while the pins of the locking assemblies are compressed against radial slots 843-1 and 843-2 such that the openings at the end of each radial slot 843-1 (e.g., opening 844-1) and 843-2 are rotated toward the pins. Upon cover 840 being rotated to a position in which the openings at the end of each radial slot 843-1 and 843-2 are over the pins, the pins can extend from the compressed position into an extended position in the openings (e.g., the pin of the first locking assembly extends into opening 844-1, and the pin of the second locking assembly extends into the opening not visible in FIG. 8) to secure the light assembly to the base, as previously described herein.

As shown in FIG. 8, cover 840 can include slots (e.g., locking radial slots) 846-1 and 846-2 located adjacent (e.g., next to) the end of slots 842-1 and 842-2, respectively. Upon cover 840 being rotated to the position in which the pins of the locking assemblies extend into the openings at the end of each radial slot 843-1 and 843-2, the rectangular arm portions of the locking assemblies can extend into slots 846-1 and 846-2 (e.g., the rectangular arm portion of the first locking assembly extends into slot 846-1, and the rectangular arm portion of the second locking assembly extends into slot 846-2) to secure the light assembly to the base, as previously described herein.

As shown in FIG. 8, cover 840 can include additional slots (e.g., additional locking radial slots) 846-3, 846-4, 846-5, and 846-6. Upon cover 840 being rotated to the position in which the pins of the locking assemblies extend into the openings at the end of each radial slot 843-1 and 843-2, the rectangular arm portions of retainer mechanisms of the airfield light (e.g., retainer mechanisms 620-1, 620-2, 620-3, and 620-4 previously described in connection with FIG. 6) can extend into slots 846-3, 846-4, 846-5, and 846-6 (e.g., the rectangular arm portion of a first one of the retainer mechanisms extends into slot 846-3, the rectangular arm portion of a second one of the retainer mechanisms extends into slot 846-4, etc.) to secure the light assembly to the base, as previously described herein.

As shown in FIG. 8, cover 840 can include openings (e.g., windows) 848-1 and 848-2 located directly across from one another. Light emitted by the light assembly (e.g., by light sources of the light assembly) can exit the airfield light through openings 848-1 and 848-2.

Figure 9:
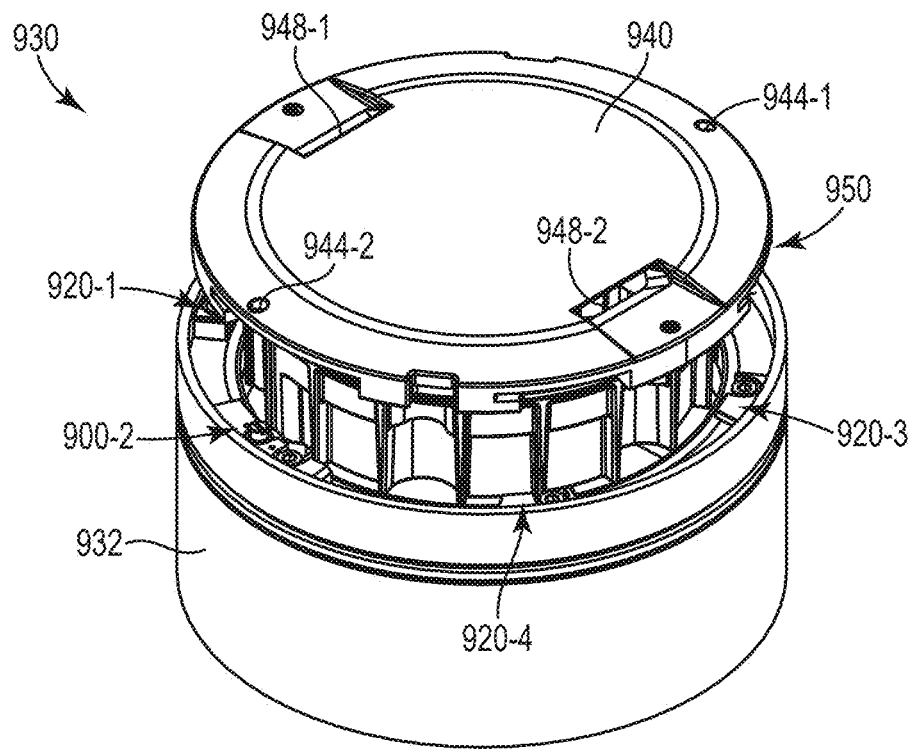
FIG. 9 illustrates a perspective view of an airfield light in accordance with an embodiment of the present disclosure.

FIG. 9 illustrates a perspective view of an airfield light 930 in accordance with an embodiment of the present disclosure. As shown in FIG. 9, airfield light 930 can include a base 932, and light assembly 950 having a cover 940.

Base 932 can be, for instance, base 632 and/or 732 previously described in connection with FIGS. 6 and 7, respectively. For example, base 932 can have locking assembly 900-2 analogous to locking assembly 600-2 coupled (e.g., mounted) thereto (as illustrated in FIG. 9), as well as a second locking assembly analogous to locking assembly 600-1 (not visible in FIG. 9 due to the positioning of the perspective view illustrated in FIG. 9) coupled thereto. Further, base 932 can have retainer mechanisms 920-1, 920-3, and 920-4 analogous to retainer mechanisms 620-1, 620-3, and 620-4 coupled (e.g., mounted) thereto (as illustrated in FIG. 9), as well as a fourth retainer mechanism analogous to retainer mechanism 620-2 (not visible in FIG. 9 due to the positioning of the perspective view illustrated in FIG. 9) coupled thereto.

Cover 940 can be, for instance, cover 840 previously described in connection with FIG. 8. For example, cover 940 can include openings (e.g., windows) 948-1 and 948-2 illustrated in FIG. 9 analogous to openings 848-1 and 848-2, as well as slots (e.g., locker arm assembly slots) analogous to slots 842-1 and 842-2, radial slots analogous to radial slots 843-1 and 843-2, openings (e.g., locking holes) 944-1 and 944-2 illustrated in FIG. 9 at the end of each radial slot analogous to openings 844, and slots (e.g., locking radial slots) analogous to slots 846 (not visible in FIG. 9 due to the positioning of the perspective view illustrated in FIG. 9).

In the example illustrated in FIG. 9, light assembly 950 is positioned (e.g., oriented) for insertion into base 932 to secure the light assembly to the base (e.g., at the beginning of the process to secure the light assembly to the base). For example, light assembly 950 is positioned such that cover 940 is positioned in the single orientation for inserting light assembly 950 into base 932 (e.g., with the radial slots of the cover corresponding to radial slots 843-1 and 843-2 positioned over the pins of the locking assemblies), as previously described herein.

Figure 10A:
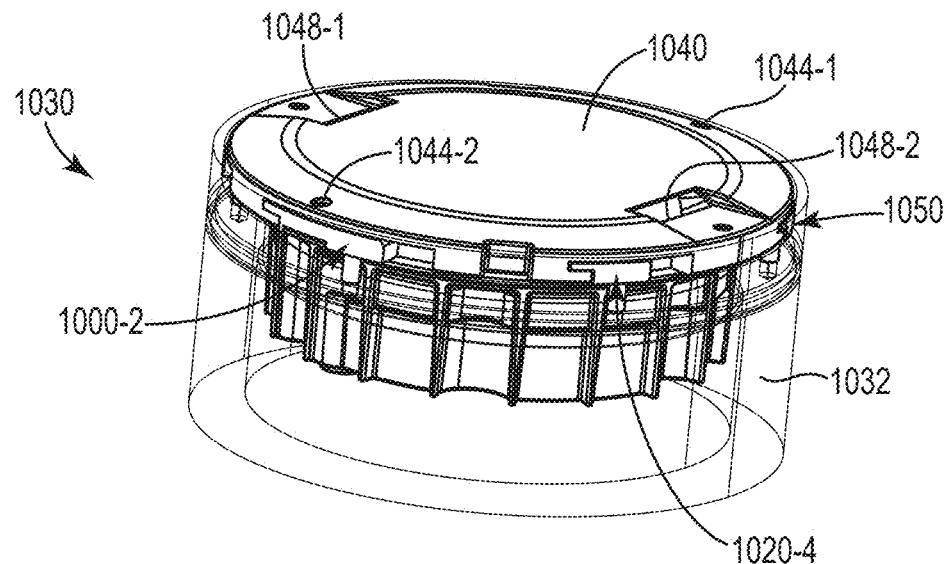
FIG. 10A illustrates a perspective view of an airfield light in accordance with an embodiment of the present disclosure.
Figure 10B:
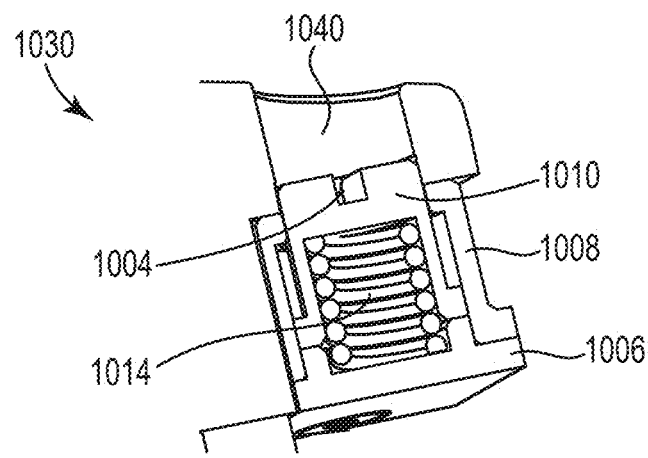
FIG. 10B illustrates a cross-sectional view of a portion of the airfield light of FIG. 10A in accordance with an embodiment of the present disclosure.

FIG. 10A illustrates a perspective view of an airfield light 1030 in accordance with an embodiment of the present disclosure. FIG. 10B illustrates a cross-sectional view of a portion of airfield light 1030.

Airfield light 1030 can be, for example, airfield light 930 previously described in connection with FIG. 9. For example, airfield light 1030 can include a base 1032 analogous to base 932 previously described in connection with FIG. 9, and light assembly 1050 having a cover 1040 analogous to light assembly 950 and cover 940, respectively, previously described in connection with FIG. 9.

For instance, base 1032 can have locking assembly 1000-2 analogous to locking assembly 900-2 coupled (e.g., mounted) thereto (as illustrated in FIG. 10A), as well as a second locking assembly (not visible in FIG. 10A due to the positioning of the perspective view illustrated in FIG. 10A) coupled thereto, as previously described in connection with FIG. 9. Further, base 1032 can have retainer mechanism 1020-4 analogous to retainer mechanism 920-4 coupled (e.g., mounted) thereto (as illustrated in FIG. 10A), as well as three other retainer mechanisms (not visible in FIG. 10A due to the positioning of the perspective view illustrated in FIG. 10A) coupled thereto, as previously described in connection with FIG. 9. Further, FIG. 10B illustrates a cross-sectional view of locking assembly 1000-2, which can include a plunging mechanism having a plate 1006, a housing 1008 coupled to plate 1006, a pin 1010 having a slot 1004, and a spring 1014 inside of housing 1008 and in contact with pin 1010, as illustrated in FIG. 10B and previously described herein.

Further, cover 1040 can include openings (e.g., windows) 1048-1 and 1048-2 illustrated in FIG. 10A analogous to openings 948-1 and 948-2. Cover 1040 can also include slots (e.g., locker arm assembly slots), radial slots, openings (e.g., locking holes) 1044-1 and 1044-2 illustrated in FIG. 10A at the end of each radial slot, and slots (e.g., locking radial slots) analogous to those previously described in connection with FIG. 9 (not visible in FIG. 10A due to the positioning of the perspective view illustrated in FIG. 10A).

In the example illustrated in FIGS. 10A and 10B, light assembly 1050 has been inserted into base 1032 and is being rotated relative to base 1032 during the process of securing the light assembly to the base. For example, pin 1010 is in contact with (e.g., pushed against) cover 1040 (e.g., the radial slot of the cover), and the weight of cover 1040 is causing pin 1010 and spring 1014 to compress, thereby allowing pin 1010 to vertically compress into housing 1008 while light assembly 1050 is rotated, as illustrated in FIG. 10B and previously described herein.

Figure 11A:
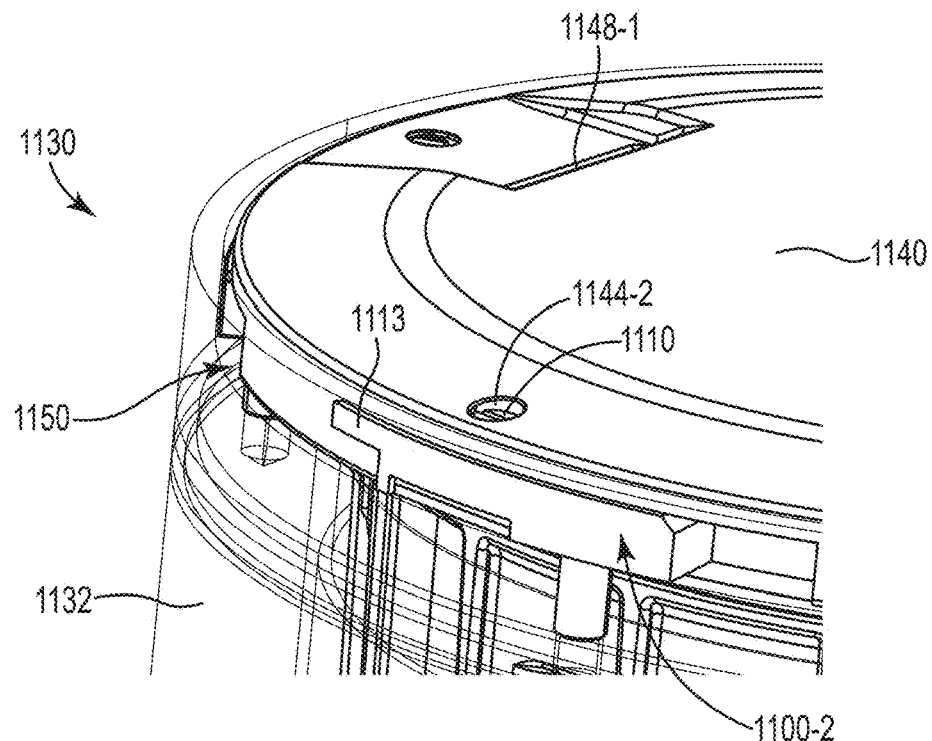
FIG. 11A illustrates a perspective view of a portion of an airfield light in accordance with an embodiment of the present disclosure.
Figure 11B:
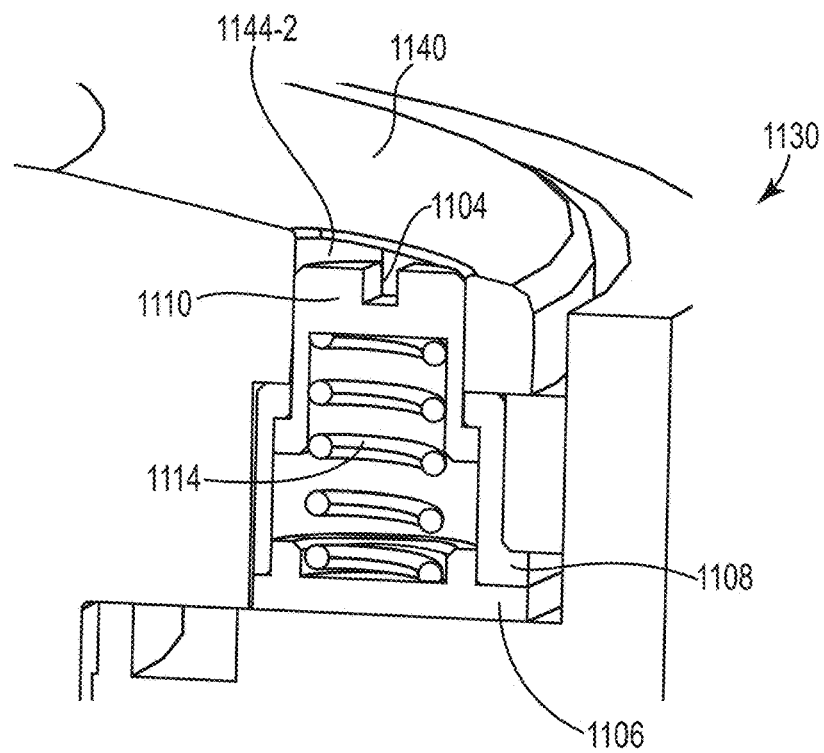
FIG. 11B illustrates a cross-sectional view of the portion of the airfield light of FIG. 11A in accordance with an embodiment of the present disclosure.

FIG. 11A illustrates a perspective view of a portion of an airfield light 1130 in accordance with an embodiment of the present disclosure. FIG. 11B illustrates a cross-sectional view of the portion of airfield light 1130.

Airfield light 1130 can be, for example, airfield light 1030 previously described in connection with FIG. 10. For example, airfield light 1130 can include a base 1132, and light assembly 1150 having a cover 1140, as previously described herein.

For instance, base 1132 can have locking assembly 1100-2 coupled thereto (as illustrated in FIG. 11A), as well as a second locking assembly (not visible in FIG. 11A due to the positioning of the perspective view illustrated in FIG. 11A) coupled thereto, as previously described herein. Further, base 1132 can have four retainer mechanisms (not visible in FIG. 11A due to the positioning of the perspective view illustrated in FIG. 11A) coupled thereto, as previously described herein. Further, FIG. 11B illustrates a cross-sectional view of locking assembly 1100-2, which can include a portion (e.g., rectangular arm) 1113 and a plunging mechanism having a plate 1106, a housing 1108 coupled to plate 1106, a pin 1110 having a slot 1104, a spring 1114 inside of housing 1108 and in contact with pin 1110, as illustrated in FIGS. 11A and 11B and previously described herein.

Further, cover 1140 can include openings (e.g., windows), including opening 1148-1 illustrated in FIG. 11A, as previously described herein. Cover 1140 can also include slots (e.g., locker arm assembly slots), radial slots, openings (e.g., locking holes) including opening 1144-2 illustrated in FIGS. 11A and 11B at the end of each radial slot, and slots (e.g., locking radial slots) (not visible in FIG. 11A due to the positioning of the perspective view illustrated in FIG. 11A), as previously described herein.

In the example illustrated in FIGS. 11A and 11B, light assembly 1150 has been fully rotated rotated relative to base 1032, such that the light assembly has been secured to the base. For example, light assembly 1150 has been rotated such that opening (e.g., locking hole) 1144-2 of cover 1140 is over pin 1110, thereby causing spring 1114 to extend and pin 1110 to extend outward from housing 1108 into opening 1144-2, as illustrated in FIGS. 11A and 11B, and previously described herein. Further, rectangular arm 1113 of locking assembly 1100-2 is extended into the locking radial slot of cover 1140, as illustrated in FIG. 11A and previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An airfield light, comprising:
    a light assembly;
    a base; and
    a locking assembly coupled to the base and configured to secure the light assembly to the base, wherein the locking assembly includes a plunging mechanism configured to:
        compress against a cover of the light assembly while the cover is being rotated relative to the base; and
        extend into an opening of the cover of the light assembly to secure the light assembly to the base; and
    wherein the locking assembly further includes a portion configured to extend into a slot of the cover of the light assembly while the plunging mechanism is extended into the opening of the cover to secure the light assembly to the base.

2. The airfield light of claim 1, wherein the airfield light includes an additional locking assembly configured to secure the light assembly to the base, wherein the additional locking assembly includes an additional plunging mechanism configured to:
    compress against the cover of the light assembly while the cover is being rotated relative to the base; and
    extend into an additional opening of the cover of the light assembly to secure the light assembly to the base.

3. The airfield light of claim 1, wherein the plunging mechanism includes a spring.

4. The airfield light of claim 1, wherein the plunging mechanism includes:
    a plate;
    a housing coupled to the plate; and
    a pin configured to:
        compress relative to the housing against the cover of the light assembly; and
        extend relative to the housing into the opening of the cover of the light assembly.

5. The airfield light of claim 4, wherein the housing is coupled to the plate by two screws.

6. The airfield light of claim 1, wherein the plunging mechanism is configured to rotate about its vertical axis.

7. The airfield light of claim 1, wherein the plunging mechanism includes a slot configured to receive a force to compress the plunging mechanism while the plunging mechanism is extended into the opening of the cover of the light assembly.

8. The airfield light of claim 1, wherein the plunging mechanism comprises one of:
    a solenoid;
    a mechanical actuator; and
    a pneumatic plunger.

9. A method of securing a light assembly of an airfield light to a base of the airfield light, comprising:
    coupling the locking assembly to the base,
    rotating a cover of the light assembly
    relative to the base, wherein:
        a plunging mechanism of a locking assembly of the airfield light retracts into a compressed position against the cover while the cover is being rotated;
        the plunging mechanism extends from the compressed position into an extended position in an opening of the cover upon the cover rotating to a position in which the opening of the cover is over the plunging mechanism; and
        a portion of the locking assembly extends into a slot of the cover while the plunging mechanism is extended into the opening of the cover to secure the light assembly to the base.

10. The method of claim 9, wherein the method includes securing the light assembly of the airfield light to the base of the airfield light without using a bolt.

11. The method of claim 9, wherein a portion of a retainer mechanism of the airfield light extends into an additional slot of the cover upon the cover rotating to the position in which the opening of the cover is over the plunging mechanism.

12. The method of claim 11, wherein the cover is prevented from being lifted while the portion of the retainer mechanism is extended into the additional slot of the cover.

13. The method of claim 9, wherein the method includes:
applying a force to the plunging mechanism to retract the plunging mechanism into the compressed position while the plunging mechanism is in the opening of the cover; and
rotating the cover of the light assembly relative to the base while applying the force to the plunging mechanism to remove the light assembly from the base.

14. The method of claim 9, wherein rotation of the cover is prevented while the plunging mechanism of the locking assembly is in the extended position in the opening in the cover.

15. An airfield light, comprising:
a light assembly;
a base; and
a locking assembly coupled to the base and configured to secure the light assembly to the base, wherein:
the locking assembly includes a plunging mechanism configured to:
compress against a cover of the light assembly while the cover is being rotated relative to the base; and
extend into an opening of the cover of the light assembly to secure the light assembly to the base; and
the locking assembly includes a portion configured to extend into a slot of the cover of the light assembly while the plunging mechanism is extended into the opening of the cover to secure the light assembly to the base.

16. The airfield light of claim 15, wherein the airfield light includes a plurality of retainer mechanisms configured to secure the light assembly to the base, wherein a portion of each respective one of the retainer mechanisms extends into a different additional slot of the cover of the light assembly to secure the light assembly to the base.

17. The airfield light of claim 16, wherein each respective one of the retainer mechanisms are smaller than the locking assembly.

18. The airfield light of claim 15, wherein the cover of the light assembly includes a slot against which the plunging mechanism of the locking assembly compresses while the cover is being rotated.

\* \* \* \* \*